United States Patent
Pappas et al.

(10) Patent No.: US 11,743,305 B2
(45) Date of Patent: Aug. 29, 2023

(54) COMPUTER-IMPLEMENTED METHOD OF RUNNING A VIRTUAL REAL-TIME COLLABORATION SESSION, WEB COLLABORATION SYSTEM, AND COMPUTER PROGRAM

(71) Applicant: Unify Patente GmbH & Co. KG, Munich (DE)

(72) Inventors: Lampros Pappas, Athens (GR); Vasileios Giatilis, Palaio Faliro (GR)

(73) Assignee: Unify Patente GmbH & Co. KG, Munich (DE)

( * ) Notice: Subject to any disclaimer, the term of this patent is extended or adjusted under 35 U.S.C. 154(b) by 90 days.

(21) Appl. No.: 17/632,588

(22) PCT Filed: Aug. 7, 2019

(86) PCT No.: PCT/EP2019/071250
§ 371 (c)(1),
(2) Date: Feb. 3, 2022

(87) PCT Pub. No.: WO2021/023385
PCT Pub. Date: Feb. 11, 2021

(65) Prior Publication Data
US 2022/0321620 A1 Oct. 6, 2022

(51) Int. Cl.
*G06F 3/033* (2013.01)
*H04L 65/401* (2022.01)
(Continued)

(52) U.S. Cl.
CPC ....... *H04L 65/4015* (2013.01); *G06Q 10/101* (2013.01); *H04L 65/403* (2013.01); *G06F 3/033* (2013.01)

(58) Field of Classification Search
CPC ... H04L 65/4015; H04L 65/403; H04L 67/10; H04L 67/02; G06Q 10/101; G06F 3/033
(Continued)

(56) References Cited

U.S. PATENT DOCUMENTS 5,781,727 A * 7/1998 Carleton ............. H04L 12/1822
348/E7.083
2004/0181579 A1 9/2004 Huck et al.
(Continued)

OTHER PUBLICATIONS

International Search Report for International Application No. PCT/EP2019/071250 dated Nov. 26, 2019.
(Continued)

*Primary Examiner* — Shahid K Khan
*Assistant Examiner* — Ahamed I Nazar
(74) *Attorney, Agent, or Firm* — Buchanan Ingersoll & Rooney PC (57) ABSTRACT

A method can include a server transmitting first data received from a first client to the at least one second client so as to display a first view on the display device of the at least one second client. The server can also receive sixth data from the first client relating to an actor event including an information indicating content displayed at the display device has changed from the first view to a second view that is intended to be shared with the at least one participant. Upon receipt of the actor event at the web collaboration server, a time window can be opened for a predetermined amount of time. The server can send an alert to provide notification that a data mismatch may occur to trigger a checking procedure in the event a second data is received relating to a pointing event within the still open time window.

17 Claims, 10 Drawing Sheets

(51) Int. Cl.
  *G06Q 10/101*    (2023.01)
  *H04L 65/403*    (2022.01)
(58) Field of Classification Search
  USPC .......................................................... 715/751
  See application file for complete search history.

(56) References Cited

U.S. PATENT DOCUMENTS

| | | | |
|---|---|---|---|
| 2006/0184872 A1* | 8/2006 | Dontcheva ............ | G06F 40/169 |
| | | | 715/251 |
| 2010/0153887 A1* | 6/2010 | Yamaguchi ............ | G06Q 10/00 |
| | | | 715/854 |
| 2013/0290872 A1* | 10/2013 | Hong .................... | G06F 40/169 |
| | | | 715/753 |
| 2017/0199789 A1 | 7/2017 | Milvaney et al. | |
| 2019/0065012 A1* | 2/2019 | Masi ....................... | G09G 5/14 |

OTHER PUBLICATIONS

Written Opinion of the International Searching Authority for International Application No. PCT/EP2019/071250 dated Nov. 26, 2019.

\* cited by examiner

COMPUTER-IMPLEMENTED METHOD OF RUNNING A VIRTUAL REAL-TIME COLLABORATION SESSION, WEB COLLABORATION SYSTEM, AND COMPUTER PROGRAM

CROSS-REFERENCE TO RELATED APPLICATIONS

This application is the United States National Stage under 35 U.S.C. § 371 of PCT International Application No. PCT/EP2019/071250, filed on Aug. 7, 2019.

FIELD

The present invention relates to computer-implemented methods of running a virtual real-time collaboration session as well as to a web collaboration system and corresponding computer programs.

BACKGROUND

In prior art, web collaboration platforms and applications are known by means of which web collaboration sessions may be held with a predetermined number of users participating in a collaboration session via a communications network using respective clients. For such collaboration platforms and applications running on the web collaboration server and/or the clients, web collaboration tools have been developed over the years aiming at increased user friendliness and facilitating remote collaboration via a communication network, as the Internet, for the users.

One of a plurality of functions and collaboration activities on a web collaboration platform is the review and presentation of documents, whereby, for example, the moderator of a web collaboration session presents a document to the other users or participants of the session by sharing his screen on which the document or part of the document, e.g., a page or an image, is displayed so that the other users are able to see the shared content at their respective remote clients on their own displays.

SUMMARY

However, in a web collaboration session, in which a number of participants are collaborating and working together, for example, on a specific document, it may happen that a participant uses a pointing device to point to an object, like e.g., a specific word, sentence, passage of a text or a figure or the like, of the shared screen which is currently being presented, e.g., by the moderator of the web collaboration session. If, however, the moderator has already moved on to a new, different view, like another page of the shared document or to another image or view, then, due to a time difference or delay between the transmission of the data relating to the pointing from the participant's client and the changing of the view of the shared screen from the moderator's client, it may happen that the participant's pointing to an object points to the wrong object when the new view of the shared screen is already presented. This is disadvantageous, since it may convey the wrong information to the other users or participants of the web collaboration session.

Embodiments of the present invention can be based on the object to overcome the drawbacks in existing collaboration systems and sessions for collaborating, for example, on a document via a shared screen, as outlined above. In particular, embodiments of the present invention can be designed and configured based on the object to provide computer-implemented methods and a corresponding web collaboration system and computer programs stored on non-transitory computer readable media according to which no misleading views of a shared document are presented to the participants.

According to embodiments of the present invention, a computer-implemented method of running a virtual real-time collaboration session is provided, with at least one first client used by a moderator of the collaboration session and at least one second client used by at least one participant of the collaboration session, the first and second clients being connected to each other via a web collaboration server over a communication network, wherein the method comprises the steps of receiving, at the web collaboration server, during the web collaboration session, first data from the first client relating to content of a first view displayed on a screen of a display device of the first client and intended to be shared so as to be displayed on a respective display device of the at least one second client, transmitting, by the web collaboration server, the first data to the at least one second client so as to display the first view on the display device of the at least one second client, wherein the method further comprises the steps of receiving, at the web collaboration server, an actor event from the first client, the actor event comprising an information that, at the first client, the content displayed at the display device has changed, in particular, from the first view to a second view, wherein the second view is intended to be shared with the at least one participant, and upon receipt of the actor event at the web collaboration server, opening a time window for a predetermined amount of time, receiving, at the web collaboration server, second data from the at least one second client, the second data relating to a pointing event, and if the second data is received within the time window, then sending an alert notification to the first client and the at least one second client so as to notify the first client and the at least one second client that a data mismatch may occur, and so as to trigger a checking procedure.

According to a preferred embodiment, the second data comprises coordinates of a position to which a pointing device has been pointed on the screen of the display device of the at least one second client, in particular, a position on the screen comprising the first view.

According to another preferred embodiment, the pointing event is generated by the at least one participant marking, with the pointing device, an object comprised in the first view.

According to still another preferred embodiment, when the pointing event is generated, a marking snapshot is created comprising the positon to which the pointing device points on the screen, in particular, in the first view, and further comprising a predetermined area around the position, wherein the predetermined area is smaller than the entire first view.

According to yet a further preferred embodiment, the marking snapshot is stored in a storage means of the at least one second client.

Preferably, the marking snapshot includes an object marked by means of the pointing device in the first view.

Further, according to another preferred embodiment, after the step of sending an alert notification, the checking procedure is started, comprising the steps of receiving, at the web collaboration server, third data from the at least one second client, the third data comprising the marking snapshot, and sending the third data to the first client.

It can also be advantageous, if after the step of sending the third data to the first client, the method further comprises the step of receiving, at the web collaboration server, the first data again from the first client.

Moreover, the method may further comprise the steps of combining, at the web collaboration server the second data and the first data so as to generate fourth data, and sending the forth data to the first client and the at least one second client for being displayed at the respective display devices as the first view comprising the marking of an object in the first view with the pointing device.

A computer-implemented method of running a virtual real-time collaboration session is provided, with at least one first client used by a moderator of the collaboration session and at least one second client used by at least one participant of the collaboration session, the first and second clients being connected to each other via a web collaboration server over a communication network, wherein the method comprises the steps of displaying, at a display device of the first client, content of a first view, sending first data relating to the content of the first view to the web collaboration server for sharing the first view with the at least one second client, determining, at the first client, if the content displayed at the display device of the first client has changed, in particular, from the first view to a second view, creating, at the first client, an actor event, the actor event comprising an information that the content displayed at the display device of the first client has changed, in particular, from the first view to a second view, wherein the second view is intended to be shared with the at least one client.

According to a preferred embodiment, the method further comprises a step of receiving, at the first client, an alert notification from the web collaboration server, wherein the alert notification notifies the first client that a data mismatch may occur, and upon receipt of the alert notification, starting, at the first client, a checking procedure.

According to another preferred embodiment, the method further comprises a step of sending, by the first client, fifth data relating the second view to the web collaboration server.

Further, the method may comprise the steps of receiving, at the first client, third data from the web collaboration server, the third data comprising a marking snapshot received by the web collaboration sever from the at least one second client, and displaying the marking snapshot on the display device of the first client, wherein while displaying the marking snapshot, an approval option is provided for the moderator using the first client to choose to return to the previous view, in particular, to the first view.

If an approval instruction is generated at the first client, then the method may further comprise a step of re-sending, by the first client, the first data to the web collaboration server.

A web collaboration system for carrying out a computer method i comprising the steps outlined above is also provided. The system can include a web collaboration server connected, via a communication network, to a first client and at least one second client.

Further, according to the present invention, a computer-program stored on a non-transitory computer readable medium such that a web collaboration server having a processor can perform an embodiment of a method having one or more of the steps outlined above when loaded into a web collaboration server and run by its processor.

Also, according to the present invention, a further computer-program is provided, performing the method outlined above, when loaded into a client computer and run by the client computer's processor.

Embodiments can provide a web collaboration session synchronization between a pointing or marking event of a participant and a change of a view to be shared by a moderator of the web collaboration session. Since the marking snapshot is created when a user marks an object or points to a location on the screen on a shared view, this marking snapshot can be used to be presented to the moderator of the collaboration session during the checking procedure so as to decide whether to go back to the previous view or not. The provision of the marking snapshot is advantageous, since it only comprises a small vicinity around the pointing location and thus, less data is transmitted to the moderator's client compared to the entire screen or view comprising the marking. Also, since the participant's client, in the event of the participant marking an object on a shared view, only transmits the data to the web collaboration server relating to the position of the marking, i.e. the position or the coordinates of the location to which a pointing device points on the screen, the data is received at the web collaboration server much faster compared to transmitting data relating to the entire view with the marking on it.

Also, since the moderator's client only sends an actor event that comprises an information that the content displayed at the display device of the first client has changed instead of sending the entire updated screen with the new, second view, the web collaboration server also receives this data much faster. Thus, it is possible to receive both events in a small time window and to perform a matching procedure. Namely, the alert notification output by the web collaboration server to both the moderator's client and the participant's client triggers a checking procedure by means of which the moderator is provided with an option to decide whether it is necessary or worth to go back to the previous view, to which the marking actually belongs. If the moderator approves going back to the previous view, then the web collaboration server will be provided with the latter again and will be able to combine the correct data, namely, the data belonging to the marking received from the participant's client and the data of the shared view in which the participant has marked an object from the moderator's client. Summarizing the above, since much less data is transmitted during a screen sharing web collaboration session, synchronization as outlined above is enabled in a very easy and efficient manner.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numerals used in the drawings include:
1 web collaboration platform;
2, 2', 2", 2''' clients;
3, 3', 3", 3''' display devices;
4 communication network;
5 web collaboration server;
6 user/participant, in particular, moderator or screen sharing user;
6', 6", 6''' users/participants of the web collaboration session;
7 content;
8 first image/first view;
9 object of image/mountains;
10 object of image/sun;
11 second image/second view;
12 marking/mouse pointer icon; and
13 marking snapshot.

DETAILED DESCRIPTION

Figure 1:
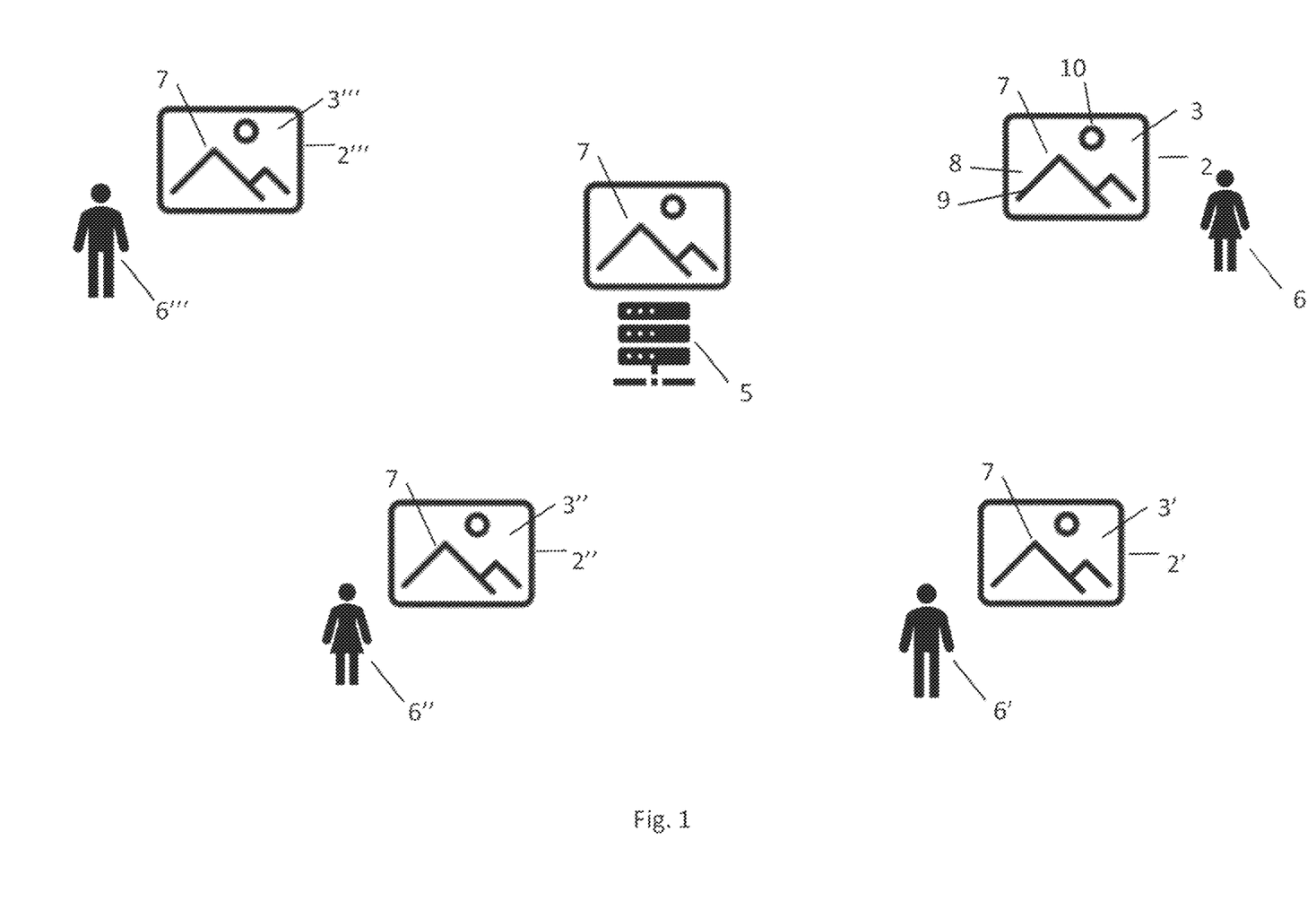
FIG. 1 illustrates a scenario of a web collaboration session in which a screen is shared at a first point of time according to a procedure according to prior art.

FIG. 1 illustrates a scenario of a web collaborations session running on a web communication platform 1, in which a number of clients 2, 2', 2", 2''' respectively comprising a display means 3, 3', 3", 3''' (e.g. a display, a liquid crystal display, a monitor, etc.) is connected via a communication network 4 to a web collaboration server 5 on which a web collaboration application is running. The clients 2, 2', 2", 2''' may be personal computers (PCs), smart phones, tablets, or the like.

A number of users comprising the users 6, 6', 6", 6''' participating in the web collaboration session respectively use the clients 2, 2', 2", 2''', which respectively are located remotely from each other and the web collaboration server 5, and which respectively are equipped with display devices 3, 3', 3", 3''' so as to display content 7 during the web collaboration session. For example, a moderator who is the screen sharing user or screen sharing participant 6 in the web collaboration session loads a file at his client 2, and opens the file in which content 7, e.g., an image 8 is stored. The image 8 is presented at the moderator's or screen sharing user's 6 screen at his client's 2 display device 3. Then the moderator or screen sharing user 6, at a first time point, shares the view of his screen with the other participants 6', 6", 6''' of the web collaboration session so that the other participants are respectively able to view the content 7 of the moderator's screen at their own display devices 3', 3", 3'''.

Figure 2:
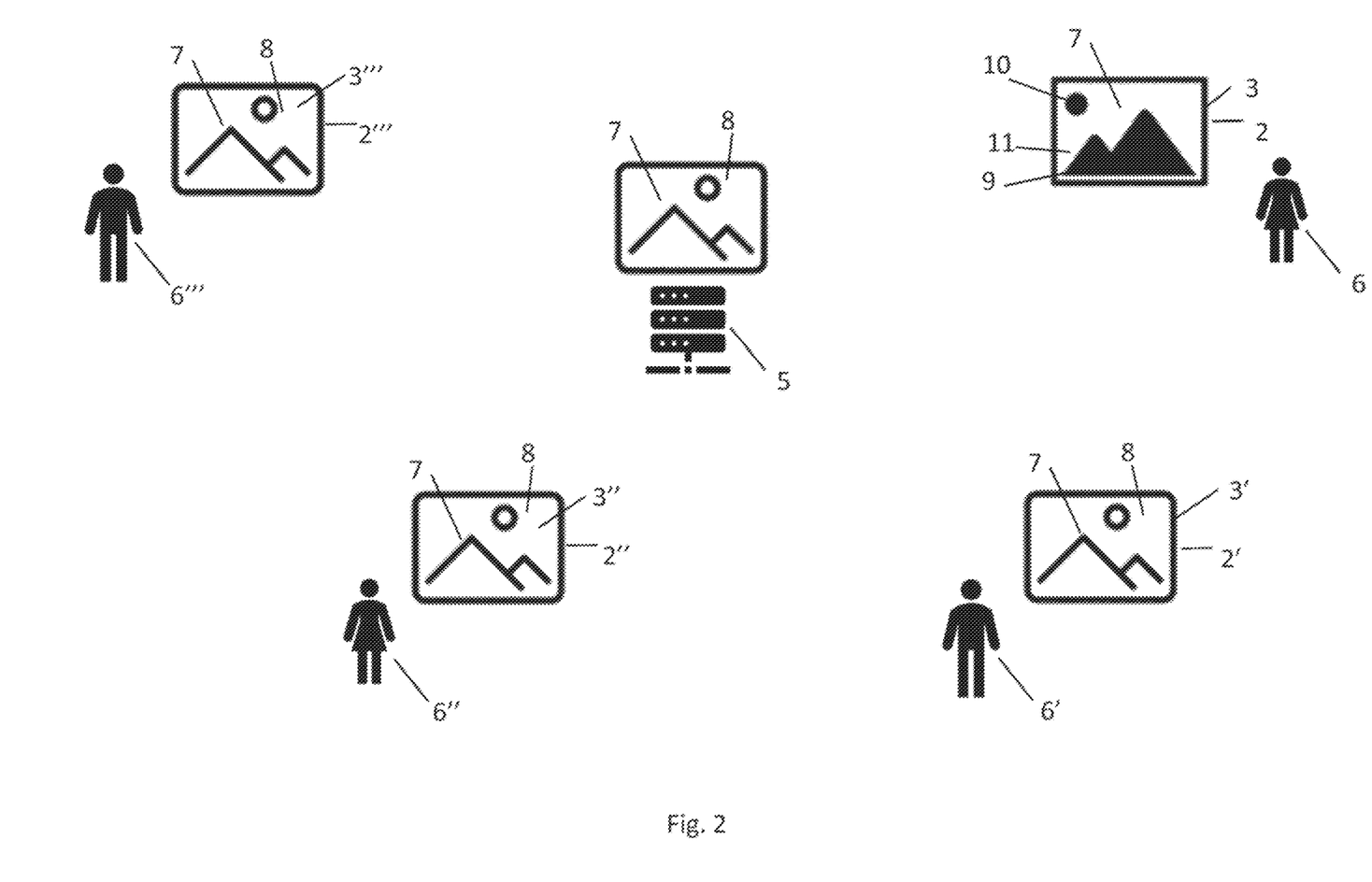
FIG. 2 illustrates a scenario of the web collaboration session at a second point of time according to a procedure according to prior art.

In this embodiment, the screen shared by the moderator or screen sharing participant 6 with the other participants 2', 2", 2''' includes a number of objects 9, 10 of a landscape scenery, here, schematically illustrated as mountains 9 and the sun 10. Basically, when the moderator or screen sharing participant 2 activates the function "screen sharing" of the content 7 displayed on the screen of his display device 3, then the information or data relating to the content 7 displayed on the screen to be shared is transmitted from the moderator's 6 client 2 via the communication network 4 to the web collaboration server 5, which further transmits the content 7 or the respective data (here, referred to as first data, i.e., the data relating to a first view shared by the moderator) relating to the content 7 to the other clients 2', 2", 2''' so as to be respectively displayed as the first image or first view 8 on the screens of the display devices 3', 3", 3'''. Thus, the participants 6', 6", 6''' are able to view the content 7 which currently (initiated or shared at the first time point) is shared by the screen sharing user 6 in the web collaborations session and all participants 6, 6', 6", 6''' are now viewing the same image or content 7 shared at the first point of time. Here, the first image or first view 8 which is shared by the moderator FIG. 2 illustrates a scenario of the web collaboration illustrated in FIG. 1 at a second point of time. Here, the screen sharing user or moderator 6 has decided to change the view, for example, by loading another file, or just scrolling up or down, or by proceeding to another page or passage of a document. It can be seen that here, the moderator's or screen sharing user's 6 screen has changed accordingly from a first view 8 to a second view 11, indicated by the objects 9, 10 illustrated in the first view or first image 8 and shared at the first point of time, being filled with black color instead of white color and indicating that the colors have changed. Also, the object 10 representing the sun has changed its position and, in the second view 11, is shifted to the left compared to the first view 8.

Figure 3:
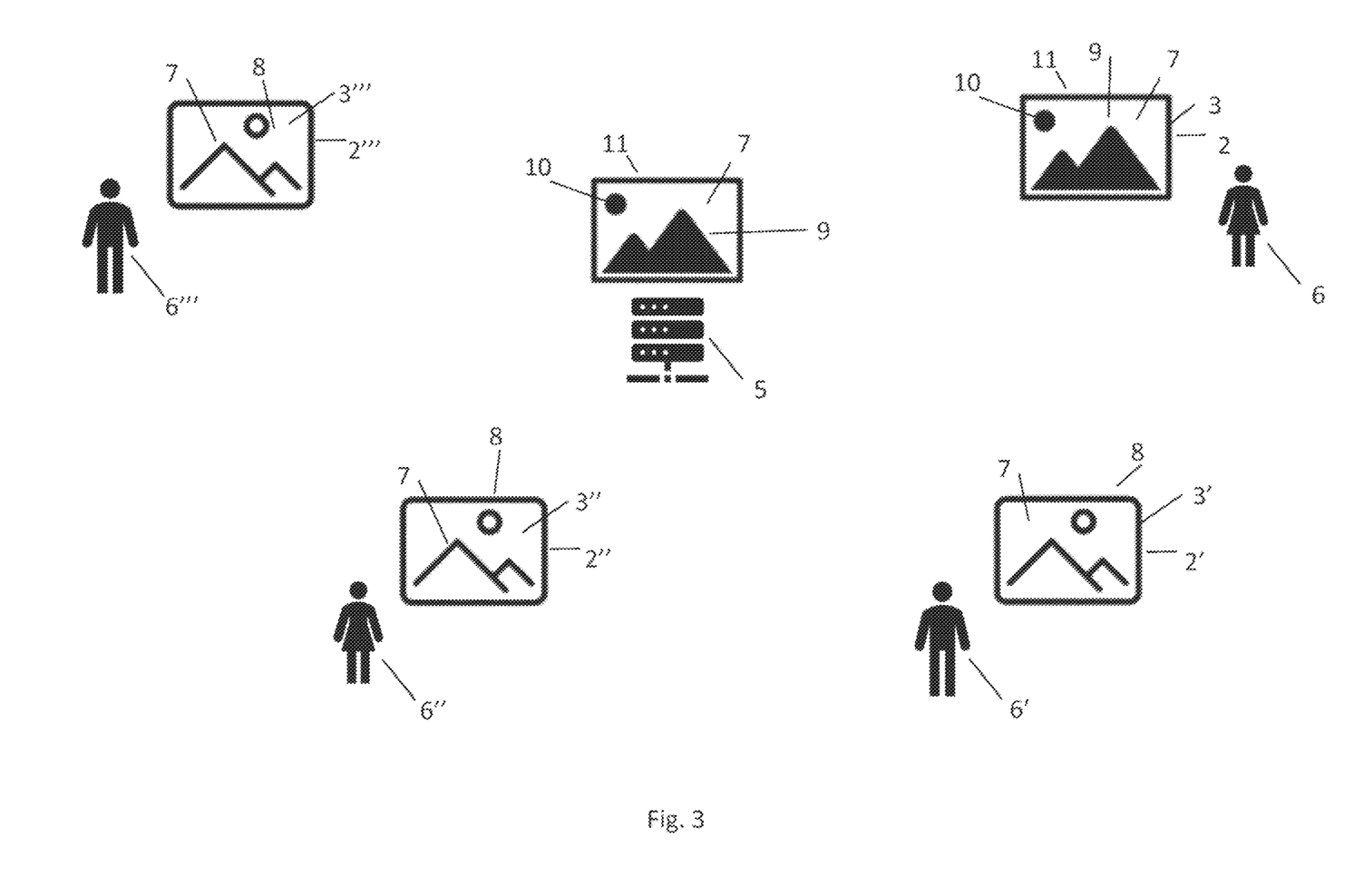
FIG. 3 illustrates a scenario of the web collaboration session at a third point of time according to a procedure according to prior art.

Again, the data (in the following referred to as the fifth data, the fifth data describing the second image) relating to this second image or second view 11 of the screen to be shared by the moderator 6 is transmitted from the client 2 of the latter to the web collaboration server 6 which thus receives the data or information relating to the second image or second view 11. This scenario is illustrated in FIG. 3, referring to a third point of time. As can be seen, in this state, only the screen sharing user or moderator 6 and the web collaboration server 5 are in hold of the fifth data relating to the second view or second image 11. The other participants 6', 6", 6''' are still viewing the first view of first image 8.

Figure 4:
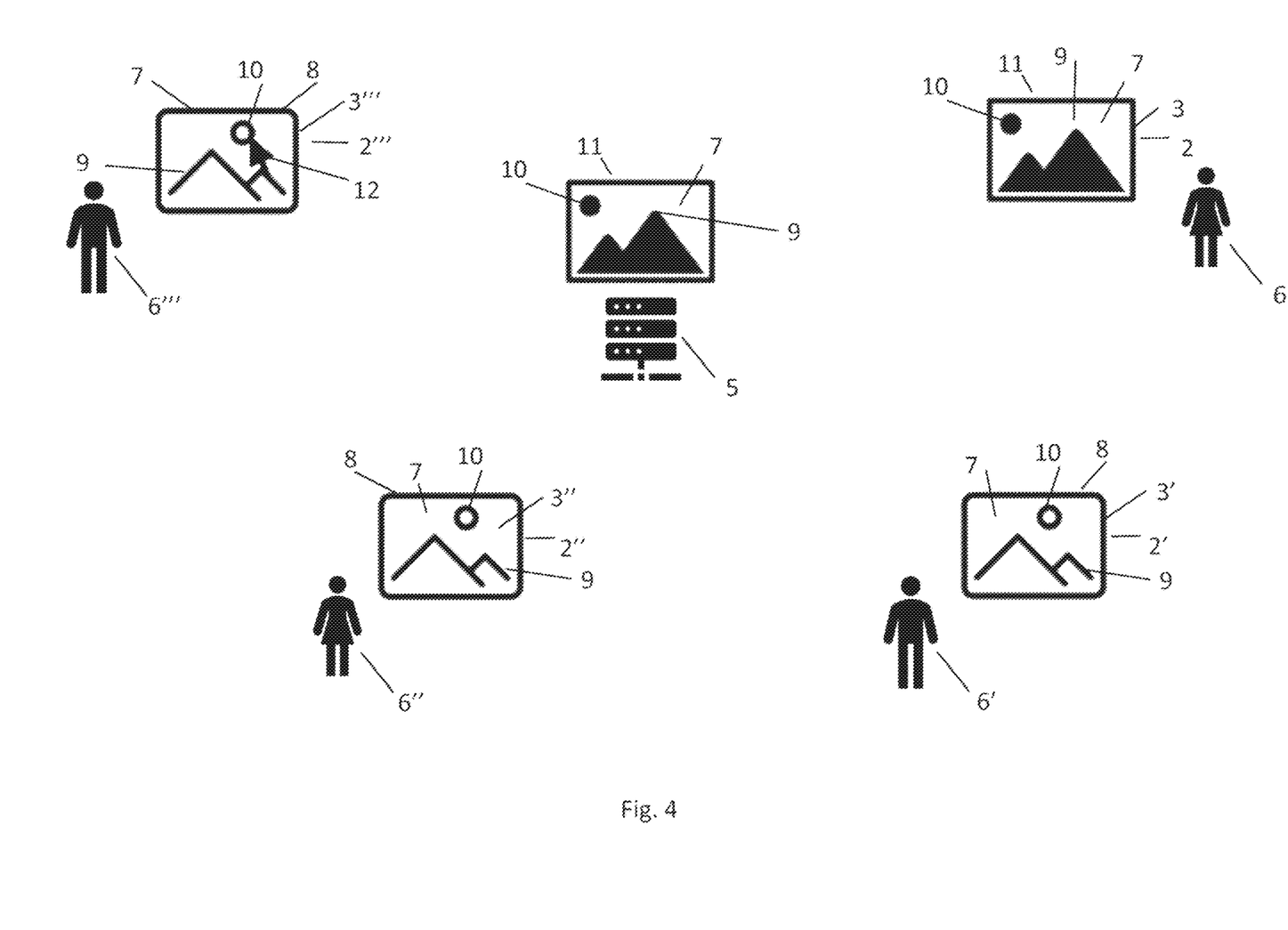
FIG. 4 illustrates a scenario of the web collaboration session at a point of time in between the second and third points of time according to a procedure according to prior art.

Now, as illustrated in FIG. 4, one of the participants, namely, the participant indicated by reference numeral 6''', at a point of time in between the point of time of FIG. 1 and the point of time of FIG. 2 has marked or pointed to an object of the image shared at the first point of time in FIG. 1, namely the sun 10, by using, for example, a pointing device. For example, the participant 6''' may mark the object 10 by clicking with a mouse connected to his or her client 2''' on the object 10 to be marked, which is indicated in the first image 8 (relating to the first point of time) by the black arrow 12 used here as a mouse pointer icon 12. The use of other pointing devices is also possible. For example, with respect to a touch screen, the user or participant 6''' may simply mark an object by means of his or her finger or a pen touching the object to be marked on the screen.

Figure 5:
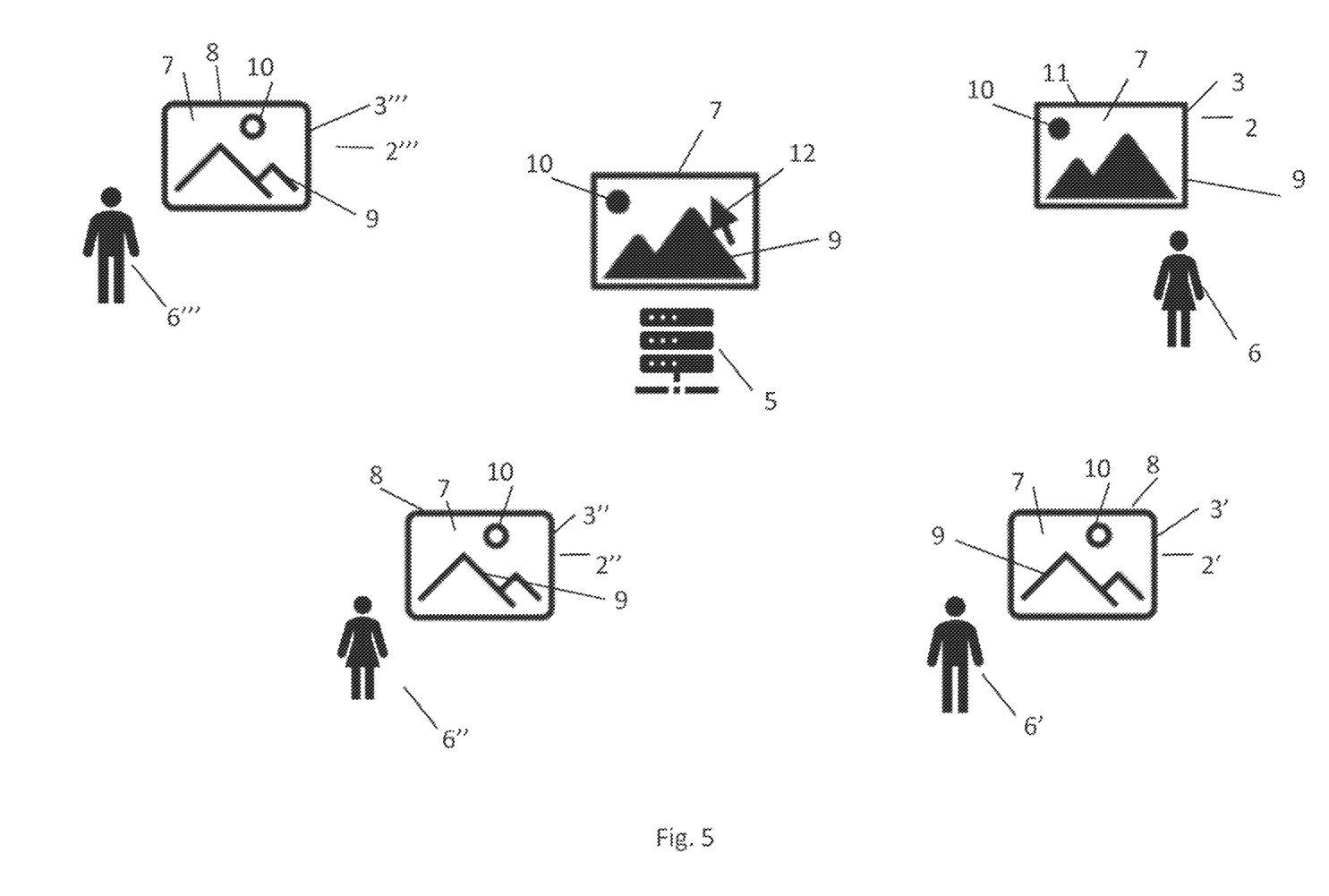
FIG. 5 illustrates a scenario of the web collaboration session at a fourth point of time according to a procedure according to prior art.

The data relating to the location on the screen of the display device 3''' to which the participant 6''' has pointed by using his or her pointing device on the first view 8 is then transmitted from the participant's client 2''' to the web collaboration server 5 via the communication network 4, which state is schematically illustrated in FIG. 5. Here, at a fourth point of time. the web collaboration server 5 comprises data received from the moderator's client 2 relating to the second view or second image 11 transmitted at a second point of time of FIG. 2 and received, at the web collaboration server 5 at a third point of time of FIG. 3, as well as data relating to the position of the pointing device on the first view 8 received from the participant's client 2''' at the point of time in FIG. 4, which is in between the first point of time of FIG. 1 and the second point of time of FIG. 2.

As can be seen, the web collaboration server 5 now combines both views, namely, the first view 8 with the marking or rather the marking on the first view 8 with the second view 11. However, since the first and second views or images 8, 11 are different, the pointing device icon referring to the position to be marked, which was intended to mark the sun 10 in the first view 8, in the second view 11 does not mark the sun 10 anymore, which in the second view 11 has shifted to the left, but instead marks the air or simply no object at all.

Figure 6:
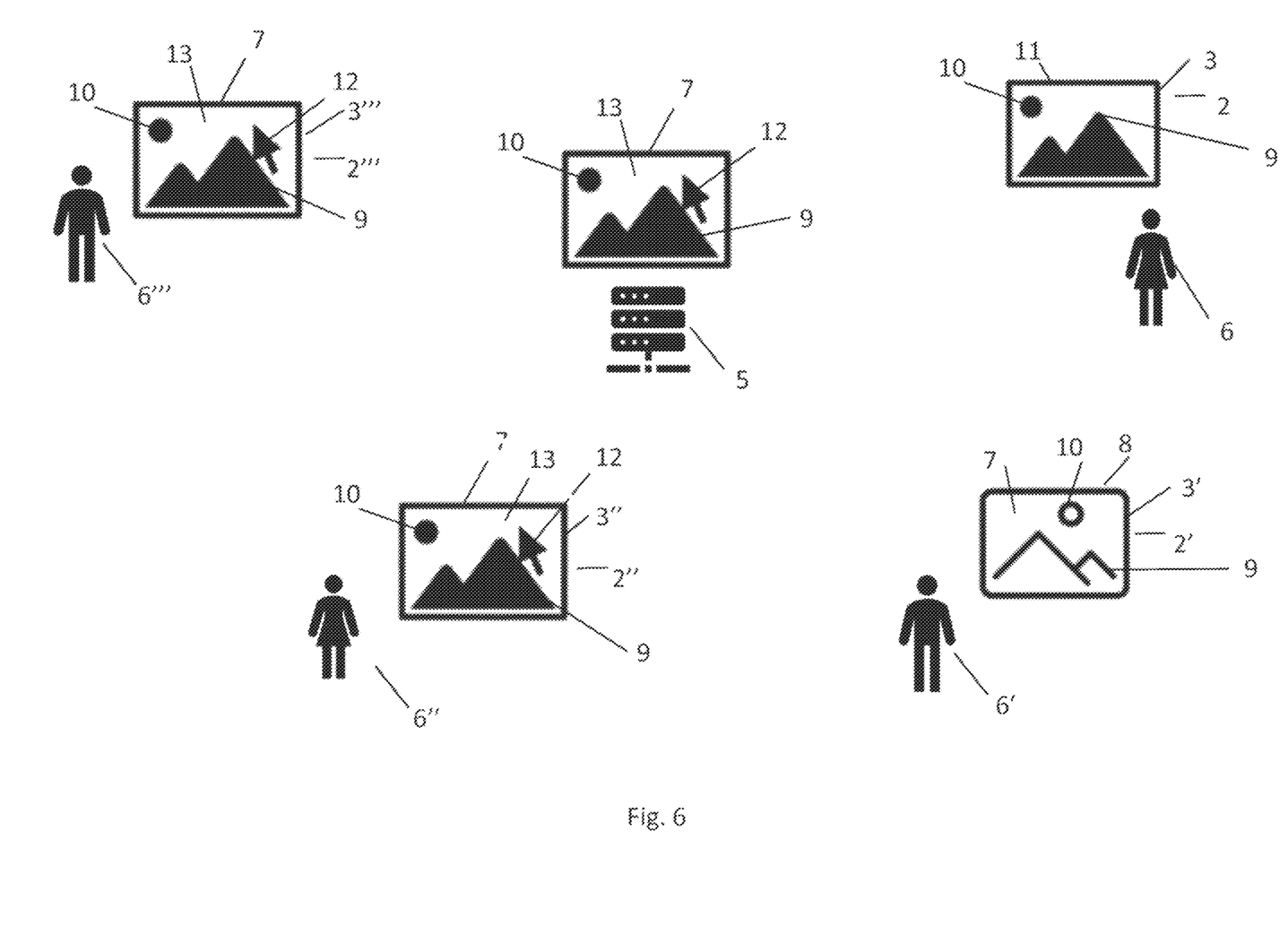
FIG. 6 illustrates a scenario of the web collaboration session at a fifth point of time according to a procedure according to prior art.

The thus generated third view or third image 13, comprising the correlation of the position of the marking at the point of time and the second view 11, in which a wrong marking is now comprised, is then transmitted to the participants 6'', 6''', at a fifth point of time, as illustrated in FIG. 6. As can be seen here, the participants 6'', 6''' receiving the third view or third image 13 from the web collaboration server 5 at their respective clients 2', 2'', 2''' are all provided with wrong information now, since the mouse pointer icon 12 does not mark the intended object 10, the sun, but is located in the air. However, the moderator or screen sharing participant 6 does not know this, since at the fifth point of time, he or she still has the second view or second image 11 displayed on the screen of his or her display device 3.

Thus, from the above, it can be concluded that the time factor is very critical in this context, since the time at which a user pushes the mouse button or touches a point on a touch screen so as to mark an object on the screen of a display device, may be too late. The web collaboration server 5 may already have updated the screen shared by another user, as outlined above, with a new view or image (here, the second view) so that the coordinates of the mouse position from the user pointing are received from the previous view (here, the first view) so that an erroneous result (here, the third view) is output to the other users or participants of a web collaboration session. This is a very common problem of such sessions.

Figure 7:
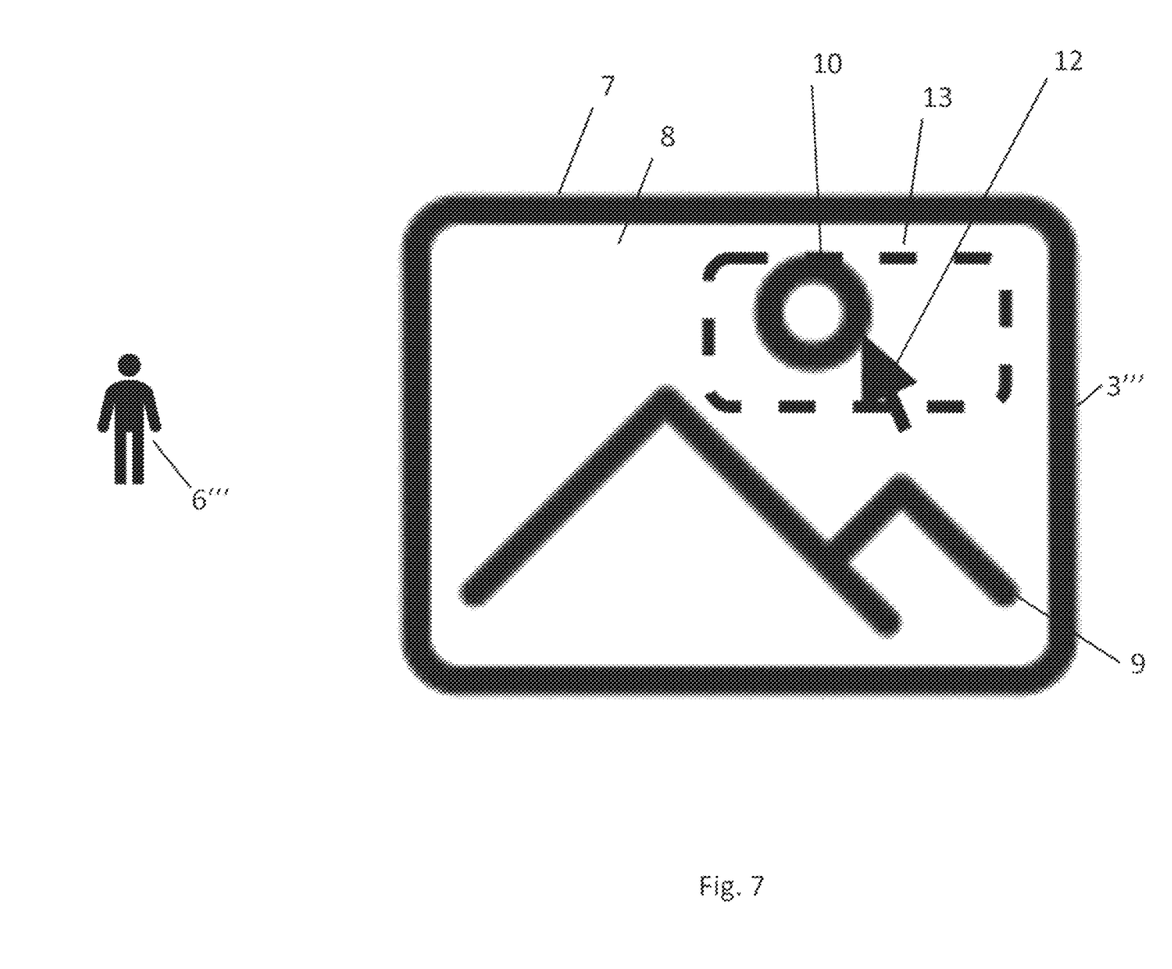
FIG. 7 schematically shows a screen of a user of a web collaboration session according to the method according to an embodiment of the invention.

FIG. 7 schematically shows a screen displayed on a display device 3' of a user 6' of a web collaboration session according to the method according to an embodiment of the invention. Basically, the scenario corresponds to the one as described above with respect to FIG. 1.

In the embodiment of FIG. 7, the clients can include a processor connected to a non-transitory computer readable medium and at least one transceiver unit for communicative connections via at least one network. The non-transitory computer readable medium can have one or more programs, or applications, stored thereon that can be run by the processor of the client, for example. The web communication server 5 can be a computer device that includes a processor connected to a non-transitory computer readable medium and at least one transceiver unit for communicative connections via at least one network. The non-transitory computer readable medium can have the web collaboration application stored thereon so it can be run by the processor of the server 5. The web collaboration server 5 can also communicate with the clients via at least one interface to facilitate the clients' running of applications for use of services hosted by the server 5. The hosted services can include services provided by the code of the web collaboration application run by the server 5.

The user or participant 6''' participating in a web collaboration session with a number of participants receives, from a web collaboration server 5, via a communication network, a first image 8 representing content 7 of a screen (or first view 8) shared by a screen sharing participant or moderator 6 of the web collaboration session. Again, the participant 6' now marks or points at, with a pointing device 12 as a mouse or the like, an object included in the first image 8, here, again the sun 10, thereby determining the position of the marking as represented by the mouse pointer icon 12 pointing at the sun 10. This procedure is referred to as a pointing event.

However, according to an embodiment of the present invention, instead of transmitting the entire image of the first view 8 including the position of the marking (as data of the coordinates, as described above in connection with FIG. 4), only a small portion of the first view 8 comprising the position marked by means of a pointing device on the screen, indicated by the tip of the mouse pointer icon 12, and the vicinity of the position marked comprising also the object 10 to be marked is cut out from the first view 8 and only this small portion of the first view 8, referred to as marking snapshot 13, is saved in the client's 2''' repository, for example, in a local memory of a smart phone or a PC. Also, only the data comprising the coordinates of the marked position (in the following referred to as second data, i.e., the data indicating the pointing event) is sent from the client 2''' to the web collaboration server 5. If the moderator 6 changes the screen intended to be shared subsequently from the first view 8 to a second view 11, when sending the information or data (the fifth data) relating to the second view 11, the moderator's client generates a so-called actor event, wherein the actor event comprises an information that, the content displayed on the screen of the display device has changed, for example, from the first view to a second view and wherein the second view is intended to be shared with the at least one participant. The actor event is sent simultaneously to the web collaboration server 5, as sixth data, but since the transmission of the information relating to the actor event (the sixth data) takes much less time than the transmission of the entire new second view 11 (the fifth data), the sixth data is received at the web collaboration server 5 much earlier than the fifth data. The receipt of the sixth data comprising the actor event triggers, at the web collaboration server 5, a predetermined time window, as will described further below in more detail.

Since from the client 2''' of the participant 6''' who has marked an object 10 comprised in the first view 8, much less information now is transmitted, namely, only data relating to the marking snapshot 13 instead of the entire updated view of the first screen 8 augmented with the position data of the marking, this can also be done much faster. Thus, the web collaboration server 5 receives, nearly at the same time or simultaneously, the sixth data relating to the actor event from the client 2 and the data relating to the marking position, e.g. coordinates of the position, from the client 2''', while the transmission of the fifth data relating to the second view 11 takes more time.

However, when the time window is opened upon receipt of the actor event, and the pointing event takes place in that time period, i.e., the second data is received at the web collaboration server 5 within the time window, then the web collaboration server 5 may send an alert notification to both the first client 2 and the at least one second client 2''' so as to notify the first client 2 and the at least one second client 2''' that a data mismatch may occur. Data mismatch means that the web collaboration server 5 has received data from the second client 2''' that belongs to the first view 8 or the first data. Since the first client 2 has notified the web collaboration server 5 by means of the actor event that the view will be changed to, e.g., a second view 11, the pointing event data might then erroneously be correlated, at the web collaboration server 5, with the second view 11. In other words, due to the data mismatch when the fifth data relating to the second view 11 is received at the web collaboration server 5, the second data will erroneously be combined by the latter with the fifth data instead of the first data, creating the effect described in connection with FIG. 5 and FIG. 6.

However, upon receipt of the alert message, the participant's client 6''' sends the marking snapshot 13 data which has been stored in the client's 6''' repository, as described above, to the web collaboration server 5 which then transmits it to the moderator's client 2. The moderator's client application, since it has been alerted, acquires the small frame of the marking snapshot 13 and displays it on its screen. Now, the moderator 2 may now decide whether to return back to the first view 8, which is correctly correlated to the marking position comprised in the marking snapshot. Upon accepting to go back to the first view 8, the moderator's screen returns to the previous view, namely here, the first view 8 again, which now is transmitted again to the web collaboration server 5 as the first data.

It is noted that the application running on the moderator's client 2, in the case described above, needs to know which view now is the correct one, to which the marking snapshot 13 or the second data belongs, to be sent back again to the web collaboration server 5. Namely, it needs to know which one actually was the previous view shared with the other participants. For this, there is provided a so-called register action event mechanism, which not only is responsible for notifying the web collaboration server of an action event that the view has been changed, but also is responsible for taking this action event back and return to the previous screen.

Then, the web collaboration serer 5 that has now received the previous view (in the example described, the first view 8) or the first data again, correlates the data relating to the marking snapshot 13, that is the second data comprising the pointing position, with the first data comprising the first view 8, and transmits the thus correlated or combined new image to all of the other participants 6, 6', 6", 6''' of the web collaboration session. Thus, all participants 6, 6', 6", 6''' now receive the correct information with the marking pointing at the correct object 10 to be marked in the first view 8.

Figure 8:
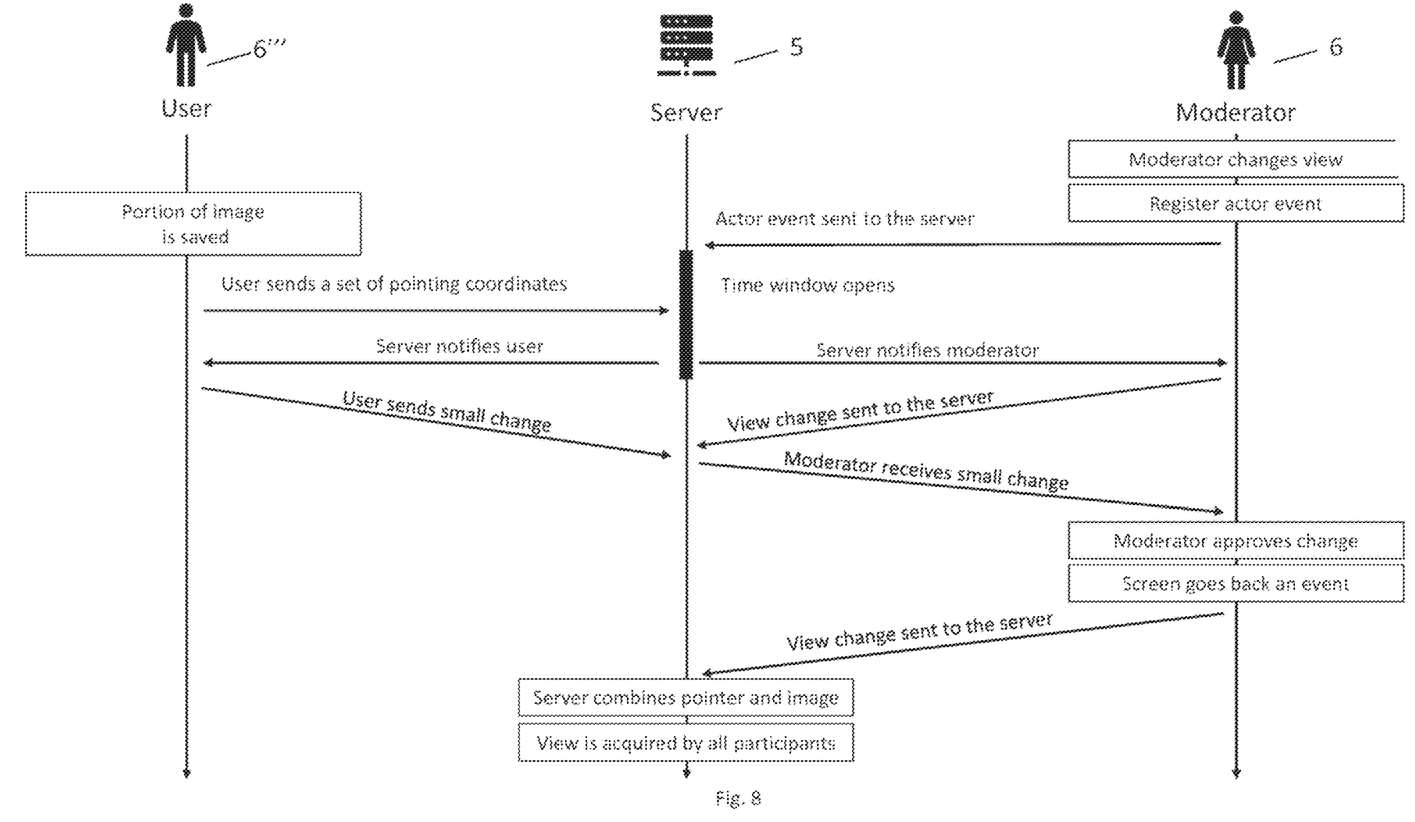
FIG. 8 shows a diagram illustrating the messaging of the communication between the moderator and the participant.

FIG. 8 shows a diagram illustrating the messaging of the communication between the moderator or screen sharing participant 6 and another regular participant 6''' of a web collaboration session. First, the moderator 6 changes the view of the screen shared with the other participants, as for example, shared with the participant 6''', from a first view 8 to a second view 11, as described above. This creates an actor event as already described above (or so-called register actor event), which is transmitted to the web collaboration server 5 as sixth data, and which opens a time window, as also outlined above. Also, the second view 11 is transmitted to the web collaboration server 5 as fifth data, but due to more data being transmitted, it arrives later than the sixth data at the web collaboration server 5. Nearly at the same time at which the web collaboration server 5 receives the actor event or the sixth data, the participant 6''' has marked an object 10 in the first view 8, as outlined above and created a pointing event. The location of the marking itself and its vicinity, including the marked object 10 or at least a part of the marked object 10, is cut out at the client 2''' and saved in its repository as the marking snapshot 13.

At the same time, the pointing coordinates of the marking are sent from the client 2''' to the web collaboration server 5 as the second data relating to the pointing event, and are received there within the time window, which has been opened, at the web collaboration server 5, upon receipt of the actor event and which still is open. Due to the receipt of the pointing event within the time window, the web collaboration server 5 notifies the participant's client 2''' that there is an actor event, namely, the view has been changed and, in response to the notification, the client 2''' sends the small image of the vicinity of the marking, referred to as the marking snapshot 13, which has been stored in the client's repository, to the web collaboration server 5. Also, the web server 5 now receives, from the moderator's client 2, the data relating to the view change, namely the fifth data relating to the second view 11.

However, instead of incorrectly combining the second view received from the first client 2 with the location information of the marking received from the second client 2''', the web collaboration server 5 now triggers a checking procedure and transmits the marking snapshot 13 to the moderator's client 2. Upon receipt of the marking snapshot 13 at the moderator's client 2, the moderator is provided with an option to choose whether to approve the view change back to the previous image or view (see above, alerting procedure), and the screen returns to the previous image or view, as already outlined above. The data relating to the previous view (in the embodiment described, the first view 8) is re-sent from the moderator's client 2 back to the collaboration web server 5, which combines the previous view (the first view 8, described above) with the correct pointer location data received from the participant's client 2'''. In other words, the web collaboration server 5 combines the first data with the second data. Now, the thus obtained correctly marked view is shared amongst all participants 6, 6', 6", 6''' of the collaboration session including the moderator so that all participants are provided with the correct information (the correctly marked object).

Figure 9:
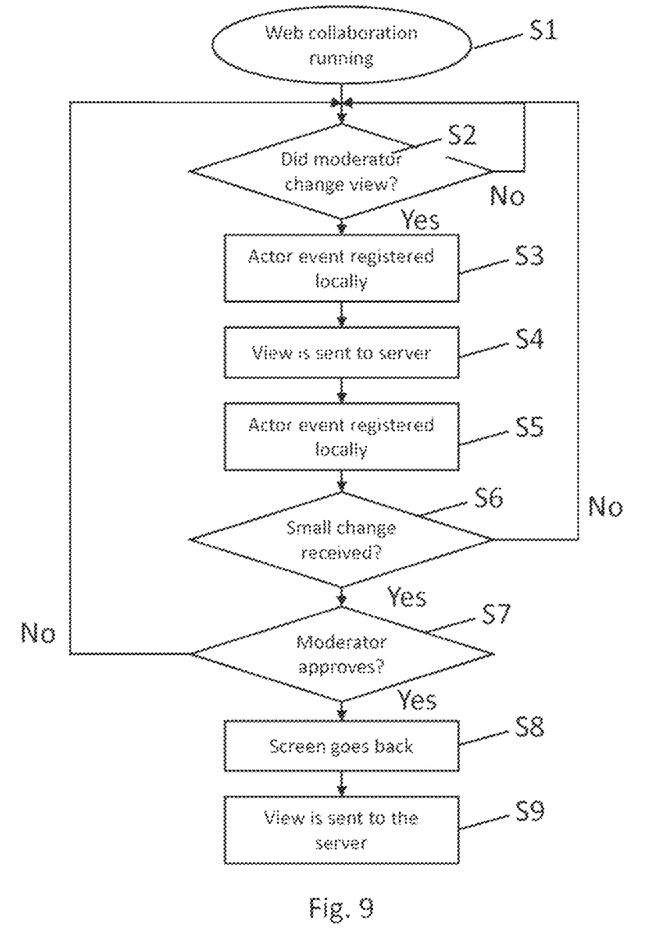
FIG. 9 is a flowchart illustrating the procedure carried out in the moderator's application.

FIG. 9 is a flowchart illustrating the procedure carried out in the application running on the moderator's client 2. In a first step S1, a web collaboration session is started, as described above. Then it is determined, in a second step S2, whether the moderator has changed a view, for example, as outlined above, from a first view 8 to a second view 11. If the moderator has changed the view, and this is ascertained by the application, then in the subsequent step S3, it is determined whether an actor event has been created or registered locally. If so, in step S4, the actor event is sent to the web collaboration server 5, as sixth data. Also, the application sends the new view, for example, the second view 11, as fifth data to the web collaboration server 5 in step S5. Then, it is determined whether the small image, namely, the marking screenshot 13 has been received (as third data) in the subsequent step S6. If so, then it is further determined, whether the moderator, at the moderator's client, approves returning to the previous view, as the first view 8, in step S7. If it is approved, then the screen returns to the previous view, as the first view 8, in step S8. Data of the first view 8 is sent again to the web collaboration server 5 as first data, in the last step S9.

Figure 10:
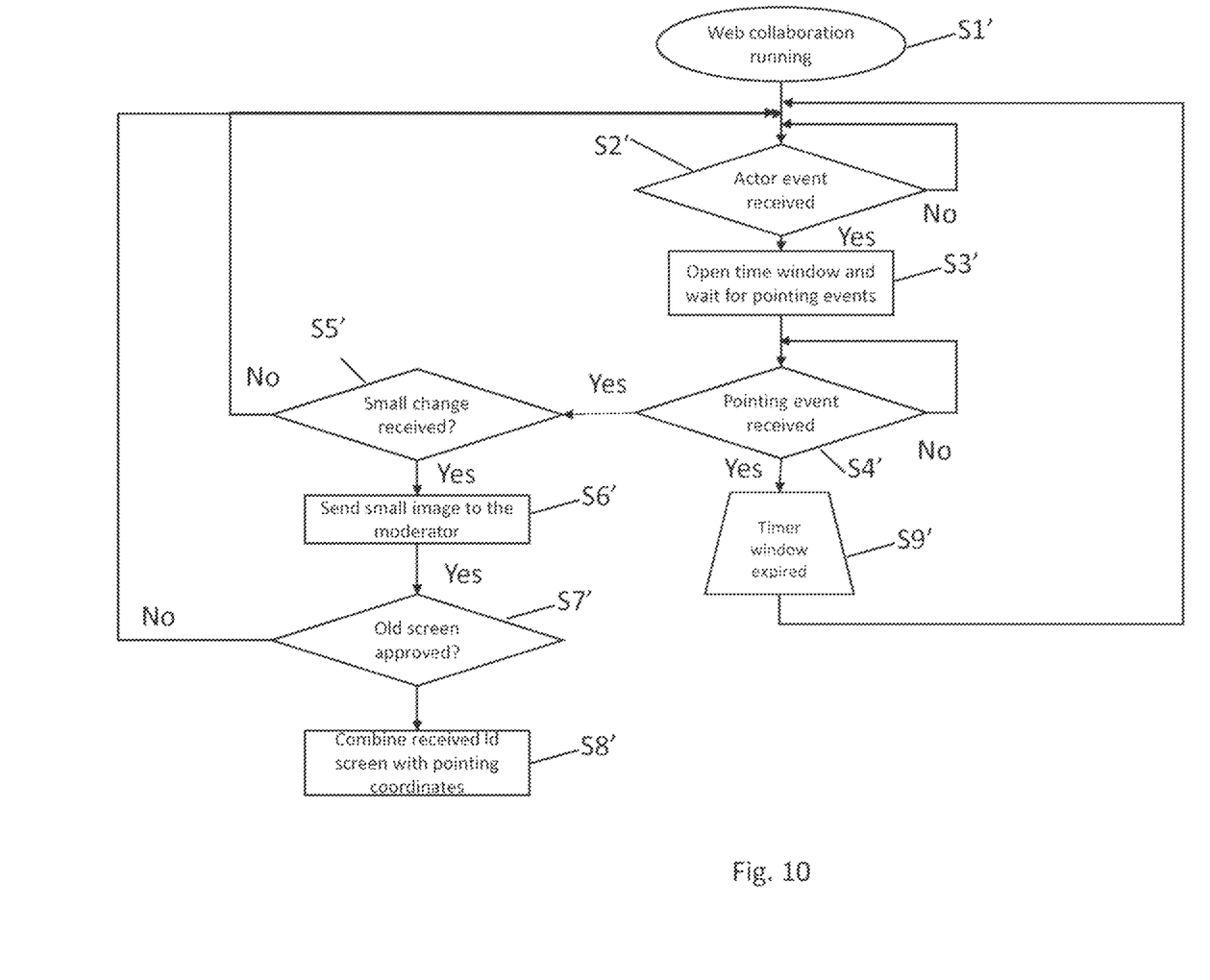
FIG. 10 is a flowchart illustrating the procedure carried out on the web collaboration server.

FIG. 10 is a flowchart illustrating the procedure carried out on the web collaboration server 5. At first, again, the procedure starts with initiating a web collaboration session in step S1'. Then in the next step S2', it is determined whether an actor event has been received from the moderator's client 2. If so, in step S3', the predetermined time window is opened so as to wait, at the web collaboration server's side, whether a pointing event is received from the participant's client 2'''. The pointing event will be indicated by receiving the pointing coordinates as second data from the participant's client 2'''. Then, in step S4', it is determined that a pointing event has been received, it also is determined, in the next step S5', whether also the small image, namely, the marking snapshot 13 has been received from the participant's client 2'''. If no pointing event is received within the predetermined time frame of the time window, the latter, in step S9', expires.

Subsequent to step S5', if the marking snapshot 13 has been received, the latter is transmitted to the moderator's client 2, step S6'. In the subsequent step S7', it is determined whether the moderator, upon receipt of the marking snapshot 13, has approved going back to the previous view to which the marking snapshot 13 belongs. If so, then the previous view and the pointing coordinates are combined by the application running on the web collaboration server 5 in the last step S8' of the procedure by combining the first data and the second data.

It is noted that the application running on the participant's client 2''' is straightforward so that it is not further described in detail on the basis of another flowchart.

Moreover, it is noted that in real collaboration systems the above described methods can be applied for a plurality of participants participating in the collaboration session, since pointing to an object on a screen may be done by several participants, either sequentially or simultaneously. The predetermined time window only opens, however, for one event but the web collaboration server may receive, in this small time frame, a lot of pointing events by many users or participants. All the pointing events or rather all the markings of objects may be projected in the same view and are then viewable by the moderator in one view, which she or he may select for presentation (i.e. going back to the previous view or not). The only difference is that the moderator will receive a lot of small images of the same view, which eventually have to be merged into one, for example, by means of an image processing algorithm implemented, for example, locally on the moderator's client.

It should be appreciated that different embodiments of the method, communication system, and a communication apparatus can be developed to meet different sets of design criteria. For example, the particular type of network connection, server configuration or client configuration for a device for use in embodiments of the method or system can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, a network, a server, a client device, a communication system, and methods of making and using the same have been shown and described above, it is to be distinctly understood that the invention is not limited thereto but may be otherwise variously embodied and practiced within the scope of the following claims.

The invention claimed is:

1. A computer-implemented method of running a virtual real-time collaboration session with at least one first client used by a moderator of the collaboration session and at least one second client used by at least one participant of the collaboration session, the first and second clients being connected to each other via a web collaboration server over a communication network, the method comprising:
   receiving, at the web collaboration server, during the web collaboration session, first data from the first client relating to content of a first view displayed on a screen of a display device of the first client intended to be shared so as to be displayed on a respective display device of the at least one second client;
   transmitting, by the web collaboration server, the first data to the at least one second client so as to display the first view on the display device of the at least one second client;
   receiving, at the web collaboration server, sixth data from the first client relating to an actor event comprising an information indicating that, at the first client, the content displayed at the display device has changed from the first view to a second view, wherein the second view is intended to be shared with the at least one participant; and
   upon receipt of the actor event at the web collaboration server, opening a time window for a predetermined amount of time,
   receiving, at the web collaboration server, second data from the at least one second client, the second data relating to a pointing event;
   sending, by the web collaboration server, an alert notification to the first client and the at least one second client so as to notify the first client and the at least one second client to trigger a checking procedure in response to the second data being received within the still open time window.

2. The method of claim 1, wherein the second data comprises coordinates of a position to which a pointing device has been pointed on the screen of the display device of the at least one second client displaying the first view.

3. The method of claim 1, wherein the pointing event is generated by the at least one participant marking, with the pointing device, an object shown in the first view.

4. The method of claim 3, comprising:
   marking a snapshot comprising the positon to which the pointing device points on the screen and a predetermined area around the position, wherein the predetermined area is smaller than the entire first view, the marking of the snapshot occurring when the pointing event is generated.

5. The method of claim 4, wherein the marking of the snapshot is stored in a non-transitory computer readable medium of the at least one second client.

6. The method of claim 5, wherein the marking of the snapshot includes an object in the first view marked via the pointing device.

7. The method of claim 5, comprising:
   starting the checking procedure after the sending of the alert notification, the checking procedure including:
      receiving, at the web collaboration server, third data from the at least one second client, the third data comprising the marking snapshot, and
      sending the third data to the first client.

8. The method of claim 7, comprising:
   receiving, at the web collaboration server, the first data again from the first client after the sending of the third data to the first client occurs.

9. The method of claim 7, comprising:
   combining, at the web collaboration server, the second data and the first data so as to generate fourth data, and sending the forth data to the first client and the at least one second client for being displayed as the first view comprising the marking of the object in the first view via the pointing device.

10. A computer-implemented method of running a virtual real-time collaboration session with at least one first client used by a moderator of the collaboration session and at least one second client used by at least one participant of the collaboration session, the first and second clients being connected to each other via a web collaboration server over a communication network, the method comprising:
displaying, at a display device of the first client, content of a first view,
sending first data relating to the content of the first view to the web collaboration server for sharing the first view with the at least one second client;
determining, at the first client, that the content displayed at the display device of the first client has changed from the first view to a second view;
creating, at the first client, an actor event comprising an information that the content displayed at the display device of the first client has changed from the first view to a second view, wherein the second view is intended to be shared with the at least one client;
receiving, at the first client, an alert notification from the web collaboration server, wherein the alert notification notifies the first client that a data mismatch is possible; and
upon receipt of the alert notification, starting, at the first client, a checking procedure.

11. The method of claim 10, comprising:
sending, by the first client, fifth data relating the second view to the web collaboration server.

12. The method of claim 11, comprising:
receiving, at the first client, third data from the web collaboration server, the third data comprising a marking snapshot received by the web collaboration sever from the at least one second client; and
displaying the marking snapshot on the display device of the first client, wherein while displaying the marking snapshot, an approval option is provided for the moderator using the first client to choose to return to the first view.

13. The method of claim 12, comprising:
re-sending, by the first client, the first data to the web collaboration server in response to an approval instruction generated at the first client.

14. A web collaboration system comprising:
a web collaboration server comprising a processor, the web collaboration server connected, via a communication network, to a first client and at least one second client; the web collaboration server configured to:
receive, during a web collaboration session, first data from the first client relating to content of a first view displayed on a screen of a display device of the first client intended to be shared so as to be displayed on a respective display device of the at least one second client;
transmit the first data to the at least one second client so as to display the first view on the display device of the at least one second client;
receive sixth data from the first client relating to an actor event comprising an information indicating that, at the first client, the content displayed at the display device has changed from the first view to a second view, wherein the second view is intended to be shared with the at least one participant; and
open a time window for a predetermined amount of time upon receipt of the actor event;
receive second data from the at least one second client, the second data relating to a pointing event; and
send an alert notification to the first client and the at least one second client so as to notify the first client and the at least one second client to trigger a checking procedure in response to the second data being received within the still open time window.

15. A non-transitory computer readable medium having a computer-program stored thereon, the program defining a method that is performed by a computer device that runs the program, the method comprising:
receiving at the computer device, during a web collaboration session, first data from a first client relating to content of a first view displayed on a screen of a display device of the first client intended to be shared so as to be displayed on a respective display device of the at least one second client;
transmitting, by the computer device, the first data to at least one second client so as to display the first view on the display device of the at least one second client;
receiving, at the computer device, sixth data from the first client relating to an actor event comprising an information indicating that, at the first client, the content displayed at the display device has changed from the first view to a second view, wherein the second view is intended to be shared with the at least one participant;
upon receipt of the actor event at the computer device, opening a time window for a predetermined amount of time,
receiving, at the computer device, second data from the at least one second client, the second data relating to a pointing event;
sending, by the computer device, an alert notification to the first client and the at least one second client so as to notify the first client and the at least one second client to trigger a checking procedure in response to the second data being received within the still open time window.

16. The non-transitory computer readable medium of claim 15, wherein the computer device is a web collaboration server.

17. A non-transitory computer readable medium having a computer-program stored thereon, the program defining a method that is performed by a computer device that runs the program, the computer device being a first client, the method comprising:
displaying, at a display device of the first client, content of a first view, sending first data relating to the content of the first view to a web collaboration server for sharing the first view with at least one second client;
determining, at the first client, that the content displayed at the display device of the first client has changed from the first view to a second view;
creating, at the first client, an actor event comprising an information that the content displayed at the display device of the first client has changed from the first view to a second view, wherein the second view is intended to be shared with the at least one client;
in response to receiving, at the first client, an alert notification from the web collaboration server, wherein the alert notification notifies the first client that a data mismatch is possible, starting, at the first client, a checking procedure.

* * * * *